(12) United States Patent
Nagae et al.

(10) Patent No.: US 7,365,450 B2
(45) Date of Patent: Apr. 29, 2008

(54) CURRENT CUTOFF CIRCUIT AND ELECTRIC STEERING WHEEL LOCK

(75) Inventors: Toshihiro Nagae, Niwa-gun (JP); Kazuya Otani, Niwa-gun (JP); Toru Maeda, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 379 days.

(21) Appl. No.: 11/014,256

(22) Filed: Dec. 16, 2004

(65) Prior Publication Data
US 2005/0132765 A1     Jun. 23, 2005

(30) Foreign Application Priority Data
Dec. 19, 2003    (JP) .............................. 2003-423656

(51) Int. Cl.
*B60R 25/02*    (2006.01)
*H01H 27/00*    (2006.01)
*H02H 3/00*     (2006.01)
*H02H 7/08*     (2006.01)

(52) U.S. Cl. .................. 307/10.3; 361/30; 361/33; 361/65; 361/78

(58) Field of Classification Search .............. 361/30, 361/33, 65, 78; 307/10.3
See application file for complete search history.

(56) References Cited

U.S. PATENT DOCUMENTS 5,539,602 A * 7/1996 Schmitz et al. ............... 361/42
6,262,871 B1 * 7/2001 Nemir et al. ................. 361/42
6,744,609 B2 * 6/2004 Hiwatari et al. .............. 361/24
6,807,035 B1 * 10/2004 Baldwin et al. .............. 361/42
6,891,708 B2 * 5/2005 Hutamura et al. .......... 361/100
7,065,993 B2 * 6/2006 Fukushima ................. 70/252

FOREIGN PATENT DOCUMENTS

| FR | 2801263 A1 * | 5/2001 |
| JP | 03-17923 | 1/1991 |
| JP | 2001-13224 | 1/2001 |
| JP | 2003-182522 | 7/2003 |
| JP | 2003-348889 | 12/2003 |

* cited by examiner

*Primary Examiner*—Michael Sherry
*Assistant Examiner*—Hal I Kaplan
(74) *Attorney, Agent, or Firm*—Synnestvedt & Lechner LLP

(57) ABSTRACT

An electric cutoff circuit for preventing overheating of a load. The current shutoff circuit includes an FET connected to a motor circuit. A relay fault detection circuit is connected to the motor circuit to detect potential at the motor circuit. A CPU sends a control signal to a relay. The CPU determines whether a fault has occurred in the relay based on the control signal sent to the relay and the detection of the relay fault detection circuit. When determining that a fault has occurred in the relay, the CPU opens the FET to configure an open circuit with the motor circuit.

8 Claims, 3 Drawing Sheets

CURRENT CUTOFF CIRCUIT AND ELECTRIC STEERING WHEEL LOCK

BACKGROUND OF THE INVENTION

The present invention relates to a current cutoff circuit and an electric steering wheel lock that prevents a load from overheating.

Steering wheel locks are installed in automobiles to prevent automobile theft in the prior art. A typical steering wheel lock is an electric steering wheel lock 51 such as that shown in FIG. 1. The steering wheel lock 51 includes a central processing unit (CPU) 52, a relay 53 controlled by the CPU 52, a motor 55 connected to the relay 53, and a lock bar 54 that engages a steering shaft (not shown) and that is moved by the motor 55. The relay 53 includes a switch 56 connected to the positive terminal of the motor 55 and a switch 57 connected to the negative terminal of the motor 55. The switches 56 and 57 each have a contact switched between a battery terminal 58a and a ground terminal 58b.

As shown in the state of FIG. 1, current does not flow to the motor 55 and the lock bar 54 does not move when the contacts of the two switches 56 and 57 are connected to the ground terminal 58b. To set the steering wheel lock 51 in a locked state, that is, to lock the steering wheel shaft, the CPU 52 switches the contact of the switch 56 to the battery terminal 58a. This produces forward rotation with the motor 55 and engages the lock bar 54 with a groove formed in the steering shaft. In this manner, the steering wheel lock 51 is set in the locked state. To set the steering wheel lock 51 in an unlocked state from the inactivation state of FIG. 1, the CPU 52 switches the contact of the switch 57 to the battery terminal 58a. This produces reverse rotation with the motor 55 and disengages the lock bar 54 from the groove formed in the steering shaft. In this manner, the steering wheel lock 51 is set in the unlocked state.

However, in such type of relay 53, unanticipated excessive current may flow though the motor circuit. In addition, there is a possibility of the contacts of the switches 56 and 57 fusing due to deficient soldering in the switches 56 and 57. For example, the contact of the switch 56 may be fused on the battery terminal 58a. In such a state, the contact of the switch 56 cannot be switched to the ground terminal 58b. Thus, current to the motor 55 cannot be cut off. In this case, current continuously flows to the motor 55 and overheats the motor 55.

SUMMARY OF THE INVENTION

The present invention provides a current cutoff circuit and an electric steering wheel lock that prevents overheating of a load.

One aspect of the present invention is a current cutoff circuit for use in a load control circuit for controlling an electric circuit including a load. The load control circuit includes a switching unit for switching an operation state of the load. The current cutoff circuit includes a switching device connected to the electric circuit. A first detection circuit connected to the electric circuit detects current or voltage of the electric circuit. A switch control circuit connected to the switching unit, the switching device, and the first detection circuit sends a control signal to the switching unit. The switch control circuit determines whether a fault has occurred in the switching unit, based on the control signal sent to the switching unit and the detection of the first detection circuit, and opens the switching unit to configure an open circuit with the electric circuit when determining that a fault has occurred in the switching device.

Another aspect of the present invention is a current cutoff circuit for use in a load control circuit for controlling a load. The load control circuit includes a switching unit for selectively connecting the load to a first voltage source and a second voltage source. The current cutoff circuit includes a switching device connected between the switching unit and the second voltage source. Two resistors are connected in series between the switching unit and the second voltage source. As shown in FIG. 2, discussed in more detail below, a switch control circuit (10) is connected to a node (17) between the two resistors (15, 16) and also to the switching unit (4), and the switching device (18), and controls the switching unit. The switch control circuit opens the switching device if potential at the node differs from potential at the second voltage source when attempting to disconnect the load from the first voltage source and the second voltage source.

A further aspect of the present invention is an electric steering wheel lock for use in a vehicle including a steering shaft. The electric steering wheel lock includes an electric circuit provided with a drive unit. A switching unit connected to the drive unit switches an operation state of the drive unit. A lock bar driven by the drive unit locks the steering shaft. A switching device is connected to the electric circuit. A first detection circuit connected to the electric circuit detects current or voltage of the electric circuit. A switch control circuit connected to the switching unit, the switching device, and the first detection circuit sends a control signal to the switching unit. The switch control circuit determines whether a fault has occurred in the switching unit, based on the control signal sent to the switching unit and the detection of the first detection circuit, and opens the switching device to configure an open circuit with the electric circuit when determining that a fault has occurred in the switching unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electric steering wheel lock 1 according to a preferred embodiment of the present invention will now be described with reference to FIGS. 2 and 3.

Figure 1:
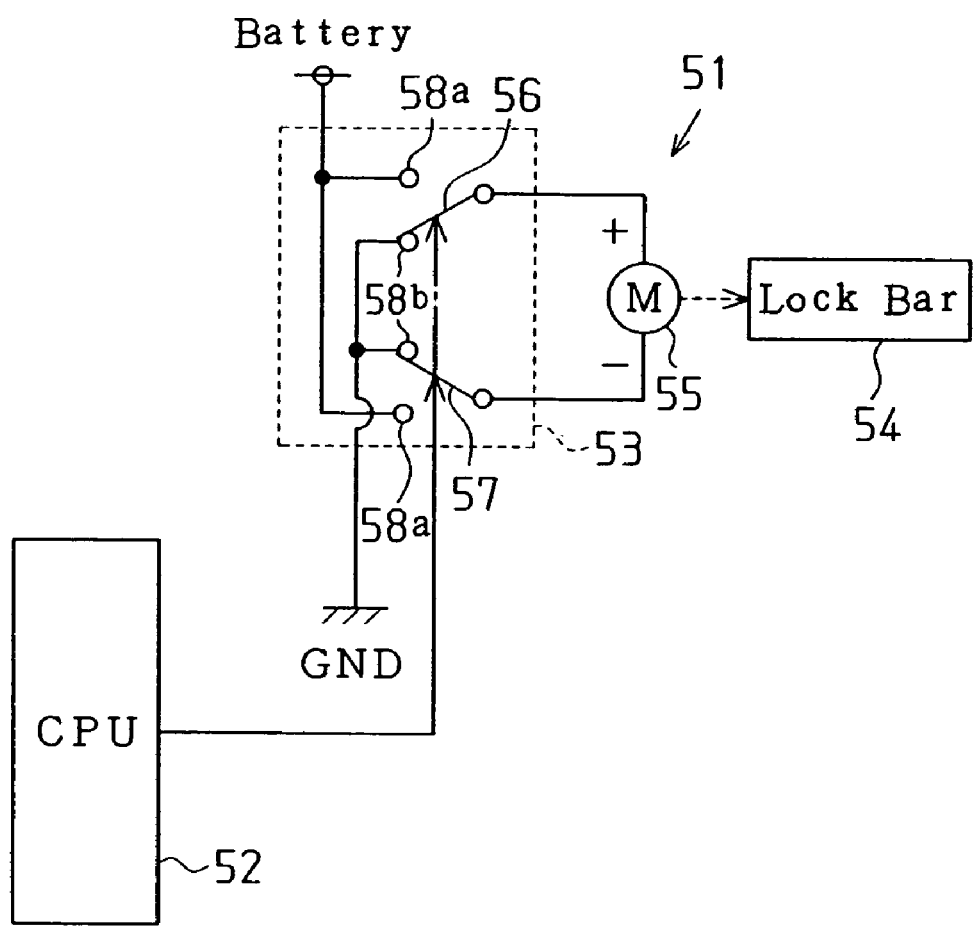
FIG. 1 is a schematic diagram showing the electric configuration of a steering wheel lock in the prior art.
Figure 2:
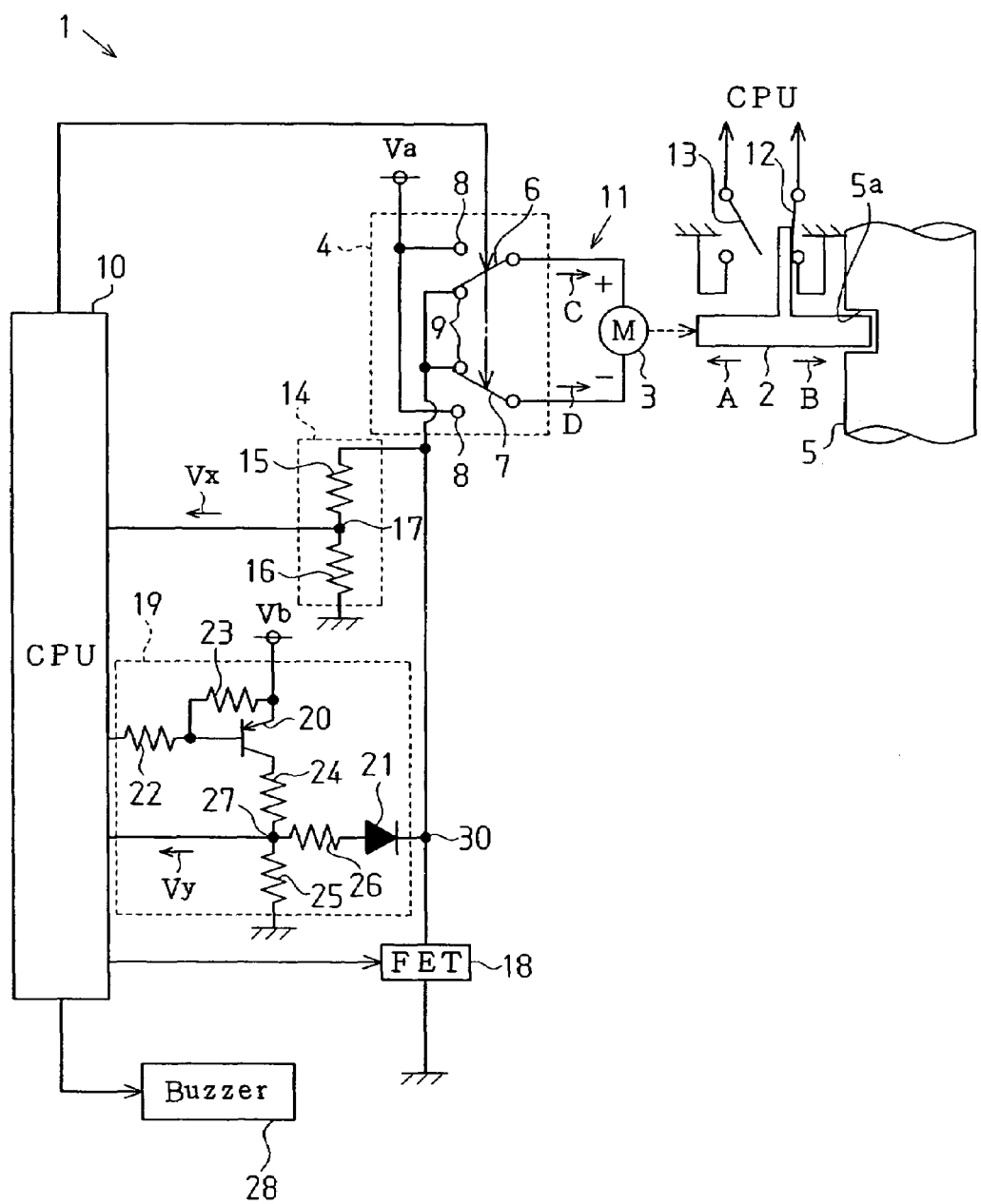
FIG. 2 is a schematic diagram showing the electric configuration of a steering wheel lock according to a preferred embodiment of the invention.

FIG. 2 is a schematic diagram showing the electric configuration of the steering wheel lock 1. The steering wheel lock 1 is installed in an automobile to restrict rotation of a steering shaft 5 when the automobile is parked. The steering wheel lock 1 includes a lock bar 2, a motor 3 functioning as a drive source of the lock bar 2, and a relay 4 for switching the operation state of the motor 3. The motor 3 moves the lock bar 2 in the direction of arrow A in FIG. 2 (movement direction of the lock bar 2 away from the steering shaft 5). The steering wheel lock 1 serves as a load control circuit, the motor 3 serves as a load (drive unit), and the relay 4 serves as a switching unit.

A groove 5a is formed in the peripheral surface of the steering shaft 5. When the lock bar 2 is engaged with the groove 5a, the steering wheel lock 1 is in a locked state. That is, the steering shaft 5 is locked. When the lock bar 2 is disengaged from the groove 5a, the steering wheel lock 1 is set in an unlocked state. That is, the steering shaft 5 is unlocked. The relay 4 includes a switch 6 connected to the positive terminal of the motor 3 and a switch 7 connected to the negative terminal of the motor 3. The switches 6 and 7 each have a contact switched between a battery terminal 8, to which battery voltage Va of a battery (power supply) is applied, and a ground terminal 9, which is connected to ground.

The steering wheel lock 1 includes a CPU 10 (steering ECU) that mainly controls the lock 1. The CPU 10 switches the contacts of the switches 6 and 7 in the relay 4 to switch the steering wheel lock 1 between the locked state and the unlocked state. Further, the CPU 10 detects whether an engine switch arranged near the steering wheel has been pressed.

For example, when the automobile is parked, the steering shaft 5 is locked. When the driver starts the engine with a smart key, an ID of the smart key is compared with an ID of the automobile. When the two IDs match and the engine switch is pressed, the CPU 10 starts an unlock operation of the steering shaft 5.

When the driver starts the engine with an ignition key (e.g., wireless key), the driver inserts the key in a key cylinder. As a result, an ID of a transponder in the key is compared with the ID of the automobile. When the two IDs match and the engine switch is pressed, the CPU 10 starts the unlock operation of the steering shaft 5.

When the steering shaft 5 is in the locked state, the switches 6 and 7 are each connected to the ground terminal 9. To unlock the steering shaft 5, the CPU 10 switches the contact of the switch 6 to the battery terminal 8 and activates the relay 4. As a result, current flows through a motor circuit 11 in the direction of arrow C in FIG. 2 to produce forward rotation with the motor 3. The motor 3 moves the lock bar 2 in the direction of arrow A in FIG. 2 (disengagement direction) and disengages the lock bar 2 from the groove 5a. In this manner, the steering shaft 5 is unlocked. The motor circuit 11 functions as an electric circuit.

The steering wheel lock 1 includes a lock switch 12 and an unlock switch 13, which are arranged near (in the vicinity of) the lock bar 2 along the movement direction of the lock bar 2. The lock switch 12 is inactivated when the lock bar 2 is disengaged from the groove 5a. The unlock switch 13 is activated when the lock bar 2 is completely disengaged from the groove 5a. When the lock switch 12 is inactivated and the unlock switch 13 is activated, the CPU 10 switches the contact of the switch 6 to the ground terminal 9 to inactivate the relay 4 and stop the operation of the steering wheel lock 1.

If the driver is using a smart key and the CPU 10 detects, for example, the opening of a door or the locking of the door, the CPU 10 starts the lock operation of the steering shaft 5. If the driver is using an ignition key (e.g., wireless key) and removes the key from the key cylinder, the CPU 10 starts the lock operation of the steering shaft 5.

When the steering shaft 5 is unlocked, the contacts of the switches 6 and 7 are connected to the ground terminal 9. To lock the steering shaft 5, the CPU 10 switches the contact of the switch 7 to the battery terminal 8 and activates the relay 4. As a result, current flows through the motor circuit 11 in the direction of arrow D in FIG. 2 to produce reverse rotation with the motor 3. The motor 3 moves the lock bar 2 in the direction of arrow B in FIG. 2 (engagement direction) and engages the lock bar 2 with the groove 5a. In this manner, the steering shaft 5 is locked. When the lock bar 2 is engaged with the groove 5, the lock switch 12 is activated and the unlock switch 13 is inactivated. In this state, the CPU 10 switches the contact of the switch 7 to the ground terminal 9 to inactivate the relay 4 and stop the operation of the steering wheel lock 1.

A relay fault detection circuit 14 for detecting a fault in the relay 4 is connected between the CPU 10 and the motor circuit 11. The relay fault detection circuit 14 includes two series-connected resistors 15 and 16. The resistor 15 has a first terminal connected to the ground terminal 9 and a second terminal connected to a first terminal of the resistor 16. A second terminal of the resistor 16 is connected to the ground. A node 17 between the resistors 15 and 16 is connected to the CPU 10. The CPU 10 is supplied with a relay monitor potential Vx at the node 17. The relay fault detection circuit 14 functions as a first detection circuit.

A field effect transistor (FET) 18 is connected parallel to the two resistors 15 and 16 between the ground terminal 9 of the relay 4 and the ground. The FET 18 is located in the current route of the motor circuit 11 and is switch-controlled in accordance with a control signal from the CPU 10. The CPU 10 provides the FET 18 with an ON signal when activating the steering wheel lock 1 (i.e., when locking or unlocking the steering shaft 5). This activates the FET 18 and configures a closed circuit with the motor circuit 11. The FET 18 functions as a switching device.

The CPU 10 executes a relay fault detection process. During the process, the CPU 10 monitors the relay monitor potential Vx and switch-controls the FET 18 based on the control signal to the relay 4 and the relay monitor potential Vx. More specifically, the CPU 10 may detect a relay monitor potential Vx that is greater than the ground potential even though the CPU 10 attempted to inactivate the relay 4. In this case, the CPU 10 determines that the contact of the relay (contact of the switch 6 or 7) has fused and current to the motor 3 cannot be cut off. Then, the CPU 10 provides an OFF signal to the FET 18 to inactivate the FET 18. This configures an open circuit with the motor circuit 11 and cuts off the current flowing through the motor 3.

Furthermore, a FET fault detection circuit 19 for defecting a fault in the FET 18 is connected between the CPU 10 and the motor circuit 11. The FET fault detection circuit 19 includes a transistor 20, a diode 21, and a plurality of resistors 22 to 26. The transistor 20 includes an emitter terminal, which is connected to a battery (not shown) having a battery voltage Vb (less than the battery voltage Va), and a base terminal, which is connected to the CPU 10 via the resistor 22. The CPU 10 switch-controls the transistor 20. When the transistor 20 is activated, current flows from the battery having the battery voltage Vb to the emitter terminal and collector terminal of the transistor 20. The FET fault detection circuit 19 functions as a second detection circuit.

The resistor 23 is connected between the emitter terminal and the base terminal of the transistor 20. The resistors 24 and 25 are connected in series between the collector terminal of the transistor 20 and the ground. A node 27 between the resistors 24 and 25 is connected to the CPU 10. The CPU 10 is supplied with an FET monitor potential Vy at the node 27.

The resistor 26 and the diode 21 are connected in series between the node 27 and a node 30 between the relay 4 and the FET 18. The diode 21 includes an anode terminal connected to the resistor 26 and a cathode terminal connected to the node 30. The CPU 10 is connected to a buzzer 28 arranged near the driver's seat. The CPU 10 controls the buzzer 28 to generate a warning sound with the buzzer 28.

Current flows to the transistor 20 when the transistor 20 is activated. When the FET 18 is activated in this state, current flows not only to the resistor 25 but also to the FET 18 via the resistor 26 and the diode 21. Further, if the transistor 20 is activated when the FET 18 is inactivated, an open circuit is configured with the motor circuit 11. Thus, current does not flow to the resistor 26, the diode 21, and the FET 18. Accordingly, the FET monitor potential Vy, which is produced when the transistor 20 is activated, differs between operation states of the FET 18. More specifically, the FET monitor potential Vy is high when the FET 18 is inactivated and low when the FET 18 is activated.

The CPU 10 executes an FET fault detection process. Before performing relay control for activating the steering wheel lock 1 (i.e., operations for activating the relay 4), the CPU 10 always executes the FET fault detection process. Prior to the relay control, the CPU 10 first provides the FET 18 with an ON signal to activate the FET 18. Further, the CPU 10 provides the transistor 20 with an ON signal so that current flows through the FET fault detection circuit 19. Then, the CPU 10 provides the FET 18 with an OFF signal to inactivate the FET 18. When doing so, the CPU 10 monitors change in the FET monitor potential Vy.

When the FET monitor potential Vy increases to a threshold value Vz or greater, the CPU 10 determines that the motor circuit 11, which includes the FET 18, is normal. Then, the CPU 10 activates the relay 4 and drives the motor 3 to lock or unlock the steering shaft 5. If the FET monitor potential Vy does not increase and remains below the threshold value Vz when the FET 18 is inactivated from an activated state, the CPU 10 determines that there is a fault in the motor circuit 11, which includes the FET 18. Thus, the CPU 10 does not activate the relay 4 and warns the driver of the fault with the buzzer 28. For example, the buzzer 28 generates a warning sound in the passenger compartment or sounds a warning outside the automobile. The relay monitor potential Vx and the FET monitor potential Vy function as a voltage value (and related current value) and a detection value.

The operation of the steering wheel lock 1 will now be discussed.

An example in which the steering shaft 5 is unlocked will be described. If the ID of a smart key or a transponder is authenticated when matched with the automobile ID, the steering wheel lock 1 is set in an unlock standby state. In this state, when the engine switch is pushed, the CPU 10 starts unlocking the steering shaft 5.

The CPU 10 then executes the FET fault detection process. The CPU 10 activates the transistor 20 with the FET 18 in an activated state so that current flows through the FET fault detection circuit 19. Current having the battery voltage Vb flows from the battery to the FET 18. Thus, the FET monitor potential Vy is lower than the threshold value Vz. Then, the CPU 10 inactivates the FET 18 while keeping the transistor 20 activated. When the FET 18 is inactivated functioning normally, current does not flow through the FET 18. Thus, the FET monitor potential Vy increases to the threshold value Vz or greater. When the CPU 10 detects that the FET monitor potential Vy has increased to the threshold value Vz or greater, the CPU 10 determines that the FET 18 is functioning normally. The CPU 10 then performs contact-control of the relay 4 to perform unlocking.

In another example, the FET 18 may have a fault such as a short circuit. In such a case, the FET 18 is not inactivated even if the CPU 10 provides the FET 18 with an OFF signal. Accordingly, current continues to flow through the FET 18 (i.e., motor circuit 11). In this state, the FET monitor potential Vy is less than the threshold value Vz. Accordingly, when the CPU 10 detects that the FET monitor potential Vy is less than the threshold value Vz even though the CPU 10 attempted to inactivate the FET 18, the CPU 10 determines that the FET 18 has a fault (short circuit fault). In this state, the CPU 10 issues a warning with the buzzer 28 to provide notification of the fault and does not activate the relay 4.

Figure 3:
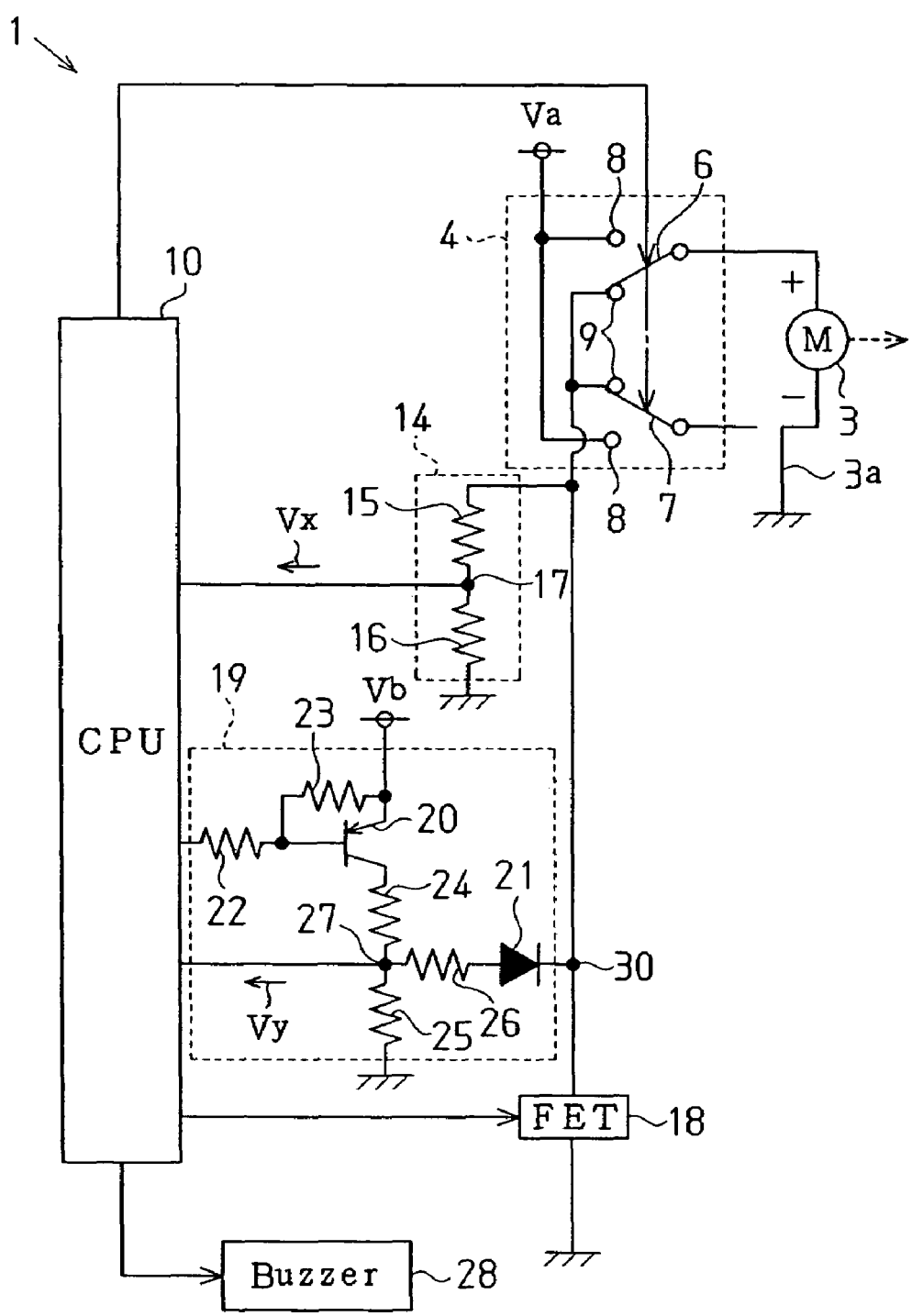
FIG. 3 is a schematic diagram showing a state when the harness of a motor is short circuited to ground.

In a further example, a harness 3a of the motor 3 may be broken and the harness 3a may be short circuited to ground, as shown in FIG. 3. Under such circumstances, when the CPU 10 provides the FET 18 with an OFF signal during the FET fault detection process, the FET 18 is functioning normally and inactivated. However, the harness 3a is short circuited to the ground. Thus, current flows through the motor circuit 11. As a result, the FET monitor potential Vy becomes less than the threshold value Vz. Accordingly, by monitoring the change in the FET monitor potential Vy, the CPU 10 may detect whether the harness 3a is short circuited to the ground. The CPU 10 does not supply current to the relay 4 and issues a warning with the buzzer 28 when the harness 3a is short circuited to the ground.

In a different example, the FET 18 does not have a short circuit fault (or the harness 3a is not short circuited to the ground) and the steering wheel lock 1 normally starts the unlock operation. In this state, the CPU 10 monitors the relay monitor potential Vx to detect a relay fault. When the CPU 10 detects that the relay monitor potential Vx is greater than the ground potential after generating a control signal to switch the relay 4 from the activated state to the inactivated state, the CPU 10 detects that a fusion has occurred in the contacts of the switches 6 and 7 and provides the FET 18 with an OFF signal. Accordingly, an open circuit is configured with the motor circuit 11 and the flow of current to the motor circuit 11 is cut off. As a result, current is prevented from flowing through the motor 3 over a long period of time. Thus, the motor 3 and the harness 3a are not overheated.

As described above, when the relay 4 has a fault, such as a contact fusion, the CPU 10 detects the fault of the relay 4 with the relay fault detection circuit 14 to inactivate the FET 18 and forcibly configure an open circuit with the motor circuit 11. Accordingly, current does not continue flowing through the motor 3 and overheating does not occur in the motor 3 even if the contact of the relay 4 is fused. Further, the CPU 10 detects that a short circuit fault has occurred in the FET 18 or that the harness 3a has been short circuited to the ground with the FET fault detection circuit 19. When a fault (short circuit) has occurred, the CPU 10 does not activate the relay 4 and stops the operation of the steering wheel lock 1. In this manner, the steering wheel lock 1 stops operating when there is a deficiency. This improves the reliability of the steering wheel lock 1.

A known overcurrent (overheating) detection FET is employed as the FET 18. The FET 18 detects its temperature and inactivates itself when the temperature reaches a predetermined value. When the relay 4 is activated and its contact is fused, the CPU 10 may function erroneously and cannot inactivate the FET 18. Under such circumstances, the FET 18 inactivates itself as its temperature increases when the motor 3 is activated over a long period of time. Thus, a open circuit is configured with the motor circuit 11. This forcibly cuts off the flow of current to the motor 3. Accordingly, the motor 3 and the harness 3a do not overheat even when the CPU 10 functions erroneously.

The steering wheel lock 1 of the preferred embodiment has the advantages described below.

(1) The steering wheel lock 1 includes the relay fault detection circuit 14. When the CPU 10 detects contact fusion in the relay 4 with the relay fault detection circuit 14, the CPU 10 inactivates the FET 18 and forcibly configures an open circuit with the motor circuit 11. Accordingly, even if fusion of a contact occurs in the relay 4, current does not flow to the motor 3 for a long period of time. This prevents overheating of the motor 3 and harness 3a. As a result, the reliability of the electric steering wheel lock 1 is improved.

(2) The steering wheel lock 1 includes the FET fault detection circuit 19. When the CPU 10 detects a short circuit fault of the FET 18 or the harness 3a being short circuited to the ground with the FET fault detection circuit 19, the CPU 10 does not activate the relay 4 and stops the operation of the steering wheel lock 1. Accordingly, when the steering wheel lock 1 has a deficiency, the unlocking and locking operations are not performed. This improves the reliability of the steering wheel lock 1.

(3) The FET fault detection circuit 19 includes a single transistor 20. When the transistor 20 is activated, the FET fault detection circuit 19 starts diagnosing the FET 18 for faults. Accordingly, the activation timing of the transistor 20 corresponds to the timing for starting the diagnosis of the FET 18. This enables the timing for starting the determination of faults to be freely set.

(4) When the FET 18 has a short circuit fault or when the harness 3a is short circuited to the ground, the buzzer 28 warns the driver of the fault. Accordingly, the driver becomes aware of the fault in the steering wheel lock 1.

(5) The CPU 10 performs diagnosis of the FET 18 whenever the steering wheel lock 1 is operated. This improves the reliability of the steering wheel lock 1.

It should be apparent to those skilled in the art that the present invention may be embodied in many other specific forms without departing from the spirit or scope of the invention. Particularly, it should be understood that the present invention may be embodied in the following forms.

The switching unit does not have to be a relay 4 and may be another type of device such as an FET or a transistor. The drive unit is not limited to a motor 3 and may be another type of drive source such as a solenoid.

In the preferred embodiment, the CPU 10 performs both fault detection of the relay 4 and fault detection of the FET 18 (the harness 3a being short circuited to the ground). Instead, a steering wheel lock may perform only the relay fault detection with the relay fault detection circuit 14 and the FET 18. Alternatively, a steering wheel lock may perform only FET fault detection with the FET 18 and the FET fault detection circuit 19.

The buzzer 28 does not necessarily have to be used to issue a warning when a short circuit fault occurs in the FET 18 or when the harness 3a is short circuited to the ground. For example, a warning may be issued by displaying a message on the instrument panel or by activating the hazard light.

In the preferred embodiment, the FET fault detection circuit 19 includes the transistor 20, the diode 21, and the resistors 22 to 26. However, the FET fault detection circuit 19 does not necessarily have to include the transistor 20. Further, current may flow through the FET fault detection circuit 19 when an ID is confirmed as being authentic.

In the preferred embodiment, when performing fault detection of the relay 4 or fault detection of the FET 18, the CPU 10 determines whether there is a fault by monitoring potentials (relay monitor potential Vx and FET monitor potential Vy). Instead, the CPU 10 may determine whether there is a fault by monitoring a current.

The application of the present invention is not limited to the steering wheel lock 1. For example, the present invention may be applied to other devices, such as a door lock or a trunk lock. Further, the application of the present invention is not limited to automobiles and may be applied to a lock for buildings such as a house.

The present examples and embodiments are to be considered as illustrative and not restrictive, and the invention is not to be limited to the details given herein, but may be modified within the scope and equivalence of the appended claims.

What is claimed is:

1. A current cutoff circuit for use in a load control circuit for controlling an electric circuit including a load, the load control circuit including a switching unit for switching an operation state of the load, the current cutoff circuit comprising:

a switching device connected to the electric circuit;

a first detection circuit, connected to the switching unit, for detecting current or voltage of the switching unit;

a switch control circuit, connected to the switching unit, the switching device, and the first detection circuit, for sending a control signal to the switching unit, the switch control circuit determining that a fault has occurred in the switching unit when the detection of the first detection circuit indicates that the switching unit is in an activated state in spite of sending the control signal for inactivating the switching unit and opening the switching device to configure an open circuit with the electric circuit; and a second detection circuit, having a detector monitor potential with a current and voltage parameter, connected between the switch control circuit and the electric circuit, for detecting the current and voltage parameter based on the operation state of the electric circuit, wherein the switch control circuit sends an operation enablement signal to the switching device, determines whether there is a fault in the switching device based on the operation enablement signal sent to the switching device and the detection of the second detection circuit, and disables operation of the switching unit when there is a fault.

2. The current cutoff circuit according to claim 1, wherein:

the second detection circuit includes a transistor switch-controlled by the switch control circuit and a diode connected to the transistor for preventing reverse flow of current from the electric circuit, the second detection circuit supplying the switch control circuit with potential at a node between the transistor and the diode; and the switch control circuit first activates the switching device and the transistor so that current flows through the switching device, inactivates the switching device while keeping the transistor activated, and determines whether a fault has occurred in at least one of the switching device and the electric circuit based on the potential at the node when the switching device is inactivated.

3. The current cutoff circuit according to claim 1, wherein the switch control circuit determines whether at least one of the switching device and the electric circuit has a fault before starting operation of the load.

4. The current cutoff circuit according to claim 1, wherein the switch control circuit determines whether at least one of the switching device and the electric circuit has a fault whenever starting operation of the load.

5. The current cutoff circuit according to claim 1, further comprising a warning unit connected to the switch control circuit, wherein the switch control circuit issues a warning of a fault with the warning unit when determining that at least one of the switching device and the electric circuit has a fault.

6. The current cutoff circuit according to claim 1, wherein the first detection circuit includes two series-connected resistors between the electric circuit and ground.

7. A current cutoff circuit for use in a load control circuit for controlling a load, wherein the load control circuit includes a switching unit for selectively connecting the load to a first voltage source and a ground, the current cutoff circuit comprising:
 a switching device connected between the switching unit and the ground;
 two resistors connected in series between the switching unit and the ground; and
 a switch control circuit, connected to a node between the two resistors, to the switching unit, and to the switching device, for controlling the switching unit, the switch control circuit opening the switching device if potential at the node differs from potential at the ground when attempting to disconnect the load from the first voltage source and the ground.

8. An electric steering wheel lock for use in a vehicle including a steering shaft, the electric steering wheel lock comprising:
 an electric circuit including a drive unit;
 a switching unit, connected to the drive unit, for switching an operation state of the drive unit;
 a lock bar driven by the drive unit for locking the steering shaft;
 a switching device connected to the electric circuit;
 a first detection circuit, connected to the switching unit, for detecting current or voltage of the switching unit;
 a switch control circuit, connected to the switching unit, the switching device, and the first detection circuit, for sending a control signal to the switching unit, the switch control circuit determining that a fault has occurred in the switching unit when the detection of the first detection circuit indicates that the switching unit is in an activated state in spite of sending the control signal for inactivating the switching unit and opening the switching device to configure an open circuit with the electric circuit; and
 a second detection circuit, having a detector monitor potential with a current and voltage parameter, connected between the switch control circuit and the electric circuit, for detecting the current and voltage parameter based on the operation state of the electric circuit, wherein the switch control circuit sends an operation enablement signal to the switching device, determines whether there is a fault in the switching device based on the operation enablement signal sent to the switching device and the detection of the second detection circuit, and disabling operation of the switching unit when there is a fault.

* * * * *